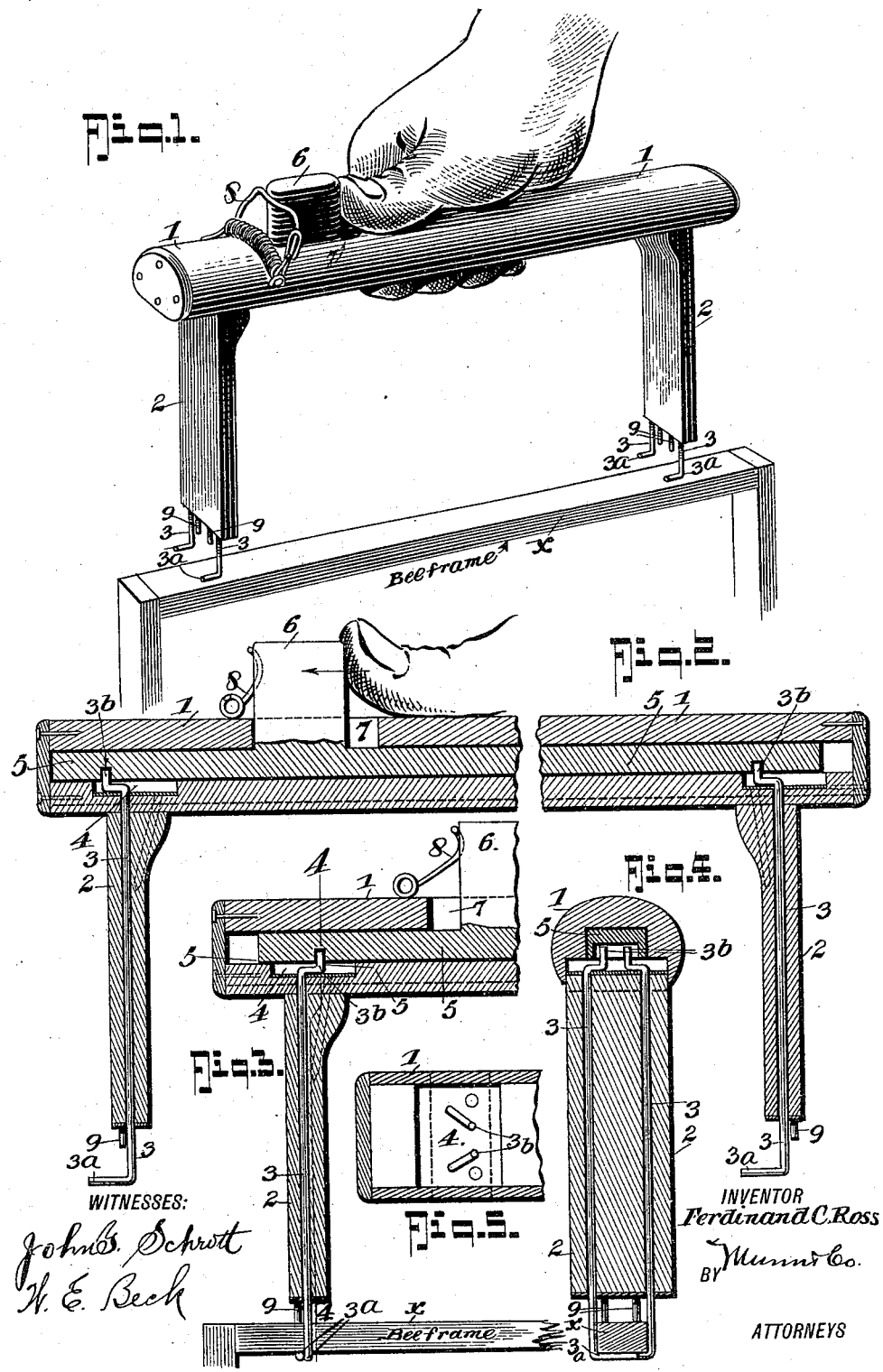

UNITED STATES PATENT OFFICE.

FERDINAND C. ROSS, OF ONOWA, IOWA.

APPLIANCE FOR REMOVING COMB-FRAMES FROM BEEHIVES.

1,184,491.  Specification of Letters Patent.  Patented May 23, 1916.

Application filed October 12, 1915. Serial No. 55,416.

*To all whom it may concern:*

Be it known that I, FERDINAND C. ROSS, a citizen of the United States, and a resident of Onowa, in the county of Monona and State of Iowa, have made an Improved Appliance for Removing Comb-Frames from Beehives, of which the following is a specification.

As is well known, it is the usual practice for apiarists to remove comb-frames from bee-hives manually, which involves more or less danger of attack from the irate bees.

My invention is an appliance adapted to be used conveniently and safely for this purpose, and to this end I have adopted the construction and combination of parts hereinafter described and illustrated in the accompanying drawing, in which, Figure 1 is a perspective view of the appliance illustrating its operation in applying it to, or removing it from, a comb-frame. Fig. 2 is a longitudinal section of the appliance showing the parts in the adjustment and relation incident to use, as in Fig. 1, that is to say, the comb-frame lifters proper being in position to be engaged with the top bar of the comb-frame. Fig. 3 is a vertical section at one end of the appliance, the comb-frame lifters being shown engaged with the top bar of the comb-frame. Fig. 4 is a vertical section on the line 4—4 of Fig. 3. Fig. 5 is a horizontal section on the line 5—5 of Fig. 3.

As illustrated in Fig. 1, the frame of my improved appliance comprises a horizontal handle bar 1 and pendent arms or lugs 2, which are rigidly attached to the underside of the handle bar and spaced apart nearly the length of a comb-frame $x$. A pair of small metallic rods 3 passes down through parallel bores in each of the arms 2, as shown in Figs. 3 and 4, and the lower ends $3^a$ of the rods are bent at a right angle, thus forming prongs adapted to be engaged with the top bar $x$ of the comb-frame, when duly adjusted with the prongs $3^a$ transverse to said bar, as shown in Figs. 3 and 4.

The upper ends $3^b$ of the rods or comb-lifters 3 are bent twice at a right angle, thus forming cranks whose extremities enter inclined slots 4 formed in the underside of a slidable bar 5, which, as shown in Figs. 1 and 2 is provided with a vertical lug or thumb-piece 6 that projects upward through an elongated slot 7 in the handle bar 1. The free end of a spiral spring 8, which is attached to the handle bar near one end, bears against the aforesaid lug 6 and holds the slidable bar 5 normally retracted to the position indicated in Fig. 4. The manner of using and applying my comb-frame lifter will now be understood.

The operator seizes the handle bar 1, as indicated in Fig. 1, and presses with the thumb of the same hand against the lug 6, thus overcoming the tension of the spring 8 and moving the slide bar 5 into the position shown in Figs. 1 and 2, which has the effect of rotating the lifter rods 3 a quarter of a revolution so that their prongs $3^a$ are parallel to each other in the direction of the length of the handle bar and slide bar. The appliance is then lowered until the prongs $3^a$ come below the top bar $x$ of the comb-frame, when the operator releases pressure on the lug 6 and the spring throws the slidable bar 5 back to its normal position, indicated in Fig. 3, by which operation the rods are rotated so as to bring prongs into parallelism transversely of the comb-frame $x$, as shown in Figs. 3 and 4. Then the operator pulls upward on the handle bar, thus extracting the comb-frame from the hive along with it.

It is apparent that to replace a comb-frame in the hive, the engagement of the appliance with the top bar $x$ is readily effected. It is apparent that when the operator releases pressure against the lug 6, the trip-bar 5 automatically resumes its normal position, (Fig. 3) and rotates the lifter rods 3 to the engaging position shown in Figs. 3 and 4, and that this engagement is retained until the apiarist again operates the trip-bar 5 by pressure against its projecting lug 6.

Each of the pendent arms 2 is provided with downwardly projecting pins 9, which, when the device is applied, as shown in Figs. 3 and 4, rest on the top bar $x$ of the comb-frame and thereby serve as stops preventing contact of the arms with the frame, so that space is left between the arms and comb-frames for the passage of bees, which might be injured if the arms 2 were allowed to come into direct contact with the comb-frame.

I claim:

1. The improved appliance for the purpose specified comprising a horizontal handle bar having pendent arms adjacent to its ends, vertical rotatable rods arranged in said arms and adapted, when rotated, to engage or release the top bar of a comb-frame, and a device connected with the handle bar for holding said rods adjusted, as described.

2. An appliance for the purpose specified comprising a horizontal handle bar having pendent arms, rotatable rods arranged in said arms, which thereby serve as guides, the ends of the said rods being cranked, as described, and a slidable spring-actuated trip bar arranged in a guide in the handle bar and engaging the upper ends of the lifter rods, as described.

3. In an appliance for the purpose specified, the combination with a horizontal handle bar having vertical guides attached rigidly to its end portion, of comb-frame lifter rods arranged in such guides, and a trip bar which is slidable on the handle bar and provided with a lug projecting above the latter, the trip bar being engaged with and adapted to rotate the lifter rod, and a spring holding the trip bar normally retracted and in position for holding the lifter rods engaged with the comb-frames, as described.

FERDINAND C. ROSS.

Witnesses:
HENRY BRENNAN,
A. W. MOORE.

Copies of this patent may be obtained for five cents each, by addressing the "Commissioner of Patents, Washington, D. C."